Jan. 22, 1935. J. W. HOEFLING 1,988,901
SLICING OR SPLITTING MACHINE
Filed Jan. 21, 1933
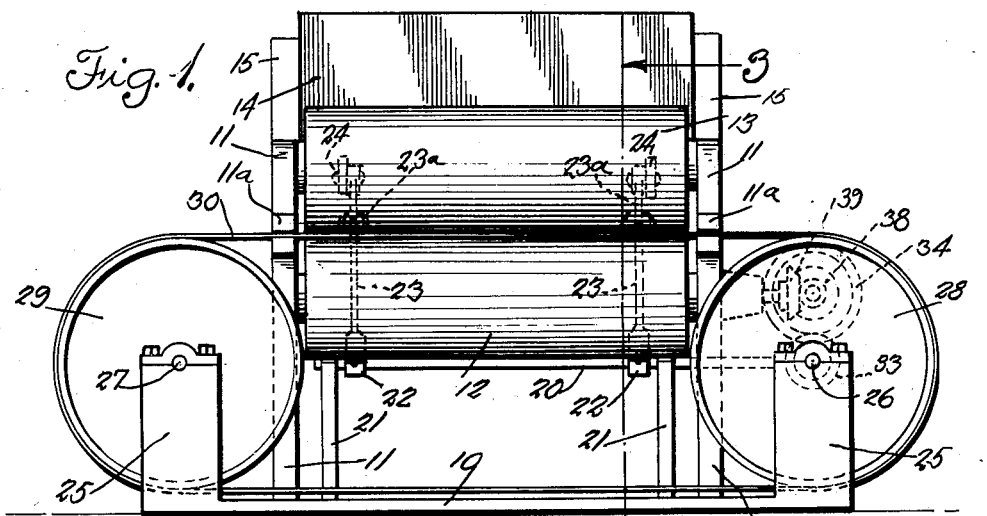
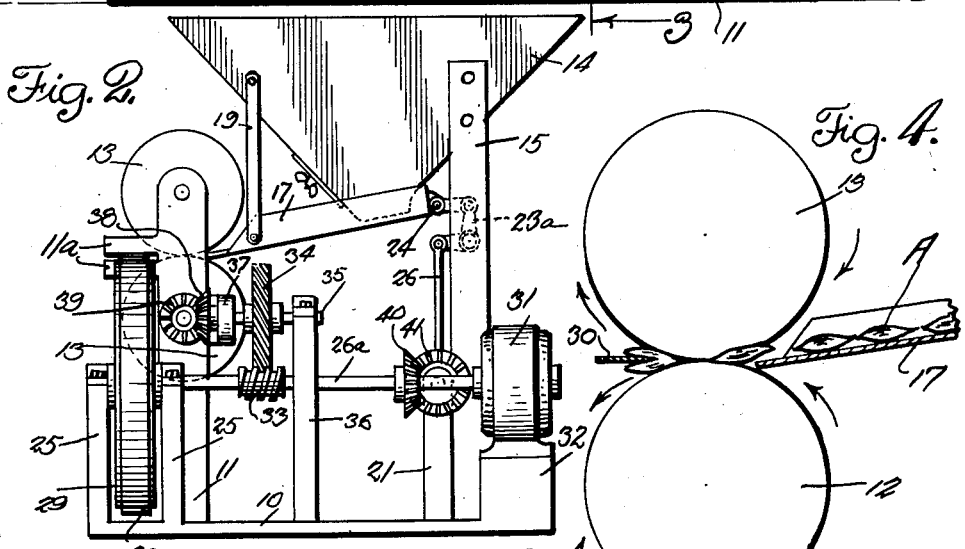
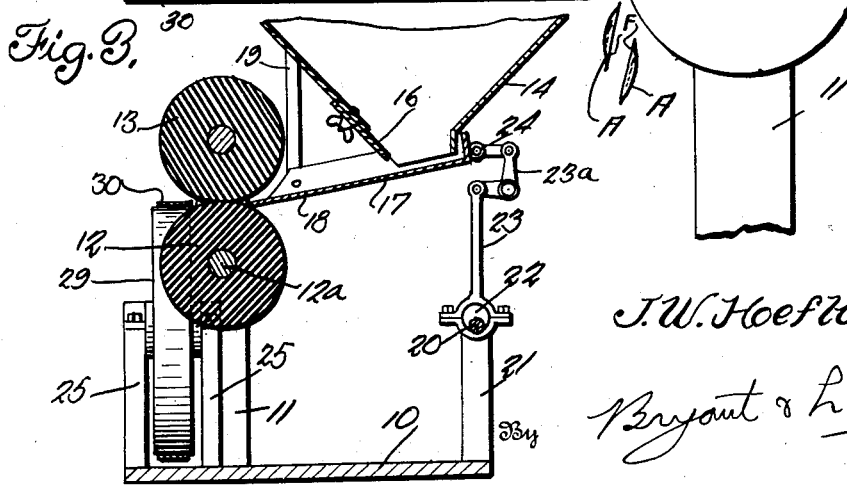
Inventor
J. W. Hoefling.
By Bryant & Lowry
Attorneys Patented Jan. 22, 1935

1,988,901

UNITED STATES PATENT OFFICE 1,988,901

SLICING OR SPLITTING MACHINE

John W. Hoefling, Chico, Calif.

Application January 21, 1933, Serial No. 652,898

2 Claims. (Cl. 146—88)

This invention relates to certain new and useful improvements in slicing or splitting machines.

The primary object of the invention is to provide a slicing or splitting machine to be used for the slicing or splitting of articles of various types or compositions and while capable of use in various arts, the same is found to be especially desirable for the splitting or halving of nut meats, such as almonds that may be used as "toppings" for cakes, candy or other decorative purposes so that a given quantity of the split nut meat will cover double the area of whole nut meats or kernels.

A further object of the invention is to provide a slicing or splitting machine of the foregoing character wherein the article to be split is fed to a cutting device by means of cushion rollers that act to automatically center the article with respect to the cutter located in proximity of the outlet side of the feed roller to insure the exact halving of the article.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a front elevational view of a slicing or splitting machine constructed in accordance with the present invention, showing a feed hopper, feed rollers and band saw having an operative run at the outlet side of the feed rollers;

Figure 2 is an end elevational view of the machine showing the operative means therefor including the vibrating delivery tray beneath the hopper;

Figure 3 is a vertical cross-sectional view taken on line 3—3 of Figure 1; and

Figure 4 is a diagrammatic end elevational view, partly in section, showing articles such as the nut meat of almonds delivered to the feed rollers and split into halves by a band saw.

Referring more in detail to the accompanying drawing, there is illustrated a slicing or splitting machine comprising a base plate 10 having standards and supports rising therefrom for the support of the mechanism. Adjacent one side edge and the ends of the base plate 10 a pair of standards 11 are provided for the rotatable support of a pair of superposed contacting feed rollers 12 and 13 peripherally contacting and preferably formed of soft rubber for the centering of articles fed therebetween without injuring such articles that may be nut meats or the like.

A tapering feed hopper 14 supported by means of standards 15 rising from the base plate 10 is provided at its lower end with an adjustable gate 16 to regulate the quantity of articles to be delivered to the feed rollers 12 and 13 by way of the feed tray 17. The forward edge of the feed tray 17 terminates in proximity of the inlet sides of the feed rollers 12 and 13 and said forward edge of said feed tray is pivotally supported as at 18 by means of links 19 that are pivoted at their upper ends to the feed hopper 14. The support for the rear end of the feed tray 17 is designed to impart vibratory movement to the feed tray for the separating and leveling of articles for delivery to the feed rollers and includes a shaft 20 horizontally journalled in the upper ends of standards 21 rising from the base plate 10, the shaft 20 carrying a pair of spaced eccentric straps 22 provided with link rods 23 that are pivotally connected as at 24 to the rear end of the feed tray 17, by means of the bell cranks 23a carried by the standards 15.

Pairs of standards 25 rise from each end of the base plate adjacent the standards 11 and rotatably support by means of journal shafts 26 and 27, band pulleys 28 and 29 respectively and over which band pulleys 28 and 29, a cutter or band saw 30 is trained, the cutting edge of the band saw being disposed in proximity of the outlet side of the feed rollers 12 and 13 to be engaged by the articles fed by said rollers before they are free of engagement with said rollers.

The operating means for the vibrating feed tray 17, feed rollers 12 and 13, and cutter 30 includes a motor 31 mounted on a support 32 rising from the base plate 10 with the shaft 26a of the motor extended as at 26 to form the support for the band pulley 28. The drive between the motor 31 and the band saw 30 is a direct one to assure maximum speed of operation of the band saw. A speed reduction drive is interposed between the shaft 26a of the motor and the shaft 12a that carries the feed roller 12 and includes a worm 32 carried by the shaft 26a that is engaged with the worm wheel 34 fixed to the shaft 35 journalled in the upper end of the standard 36 rising from the base plate 10 and in a bracket arm 37 carried by the standard 11. The bevel gear 38 upon the shaft 35 has meshing engagement with the bevel gear 39 upon the feed roller shaft 12a, the upper feed roller 13 being driven by frictional contact with the lower feed roller 12. The drive for the shaft 20 that carries the eccentric 22 for producing vibratory movements of the feed tray 17 includes a bevel gear 40 on the shaft 26a that has meshing engagement with the bevel gear 41 upon the shaft 20.

As stated, the machine may be employed for slicing or splitting articles of any character desired, the same being diagrammatically illustrated in Figure 4 for the splitting into halves of the nut meat of almonds, the shelled almonds A being fed from the trough 14 by way of the control gate 16 onto the vibrating tray 17, movements of the tray settling and separating the almonds for flat side delivery to the intake side of the feed rollers 12 and 13. As shown in Figure 4, the almonds embed themselves into the rubber feed rollers 12 and 13 which act to center the almonds in the presence of the inherent elasticity thereof for the delivery of the almonds in a flat position to the cutting edge of the band saw 30 that is disclosed in proximity of the outlet side of the feed rollers 12 and 13. The nut meat or almond is accurately presented to the band saw so that when split thereby, the almond is formed into equal halves having a flat cut face F as shown in Figure 4 and the usual rounded or outer oval face so that when the split almonds are used for toppings or decorative purposes, they present the appearance of complete nut meat. A suitable receptacle is provided for the collection of the split nut meats and the shavings or "sawdust" is retained as a by-product for desired purposes. It is to be noted that the upper run of the band saw 30 is maintained in a straight line by means of the guides 11a carried by the standards 11 to present the band saw in a straight line at the outlet side of the feed rollers 12 and 13. The feed rollers 12 and 13 are driven at a slow rate of speed by means of the worm and worm wheel drive permitting automatic centering of the nut meat by means of the cushion rollers to the band saw, the rollers engaging the nut meats with sufficient pressure to firmly hold them in position while being split and as the cutting edge of the band saw terminates in spaced relation, but adjacent to the feed rollers, breaking or chipping of the edges of the nut meats is eliminated.

While there is herein shown and described the preferred embodiment of the invention, it is nevertheless to be understood that minor changes may be made therein without departing from the spirit and scope of the invention as claimed.

I claim:—

1. In a slicing or splitting machine, a pair of elastic feed rollers, a fixed hopper, a feed tray below the hopper for delivering articles to the feed rollers, a band saw working at the outlet side of the feed rollers, driving means for the band saw, a speed reducing drive connection between the driving means and feed rollers, the feed tray being pivotally mounted on the hopper at one end adjacent the feed rollers, and a bell-crank element interposed between the driving means and opposite end of the feed tray to effect vibratory movements of the feed tray.

2. In a slicing or splitting machine, a pair of elastic feed rollers, a fixed hopper, a feed tray below the hopper for delivering articles to the feed rollers, a band saw working at the outlet side of the feed rollers, driving means for the band saw, a speed reducing drive connection between the driving means and feed rollers, hanger arms carried by the hopper for pivotally supporting the end of the tray adjacent the feed rollers and an eccentric drive for the other end of the feed tray.

JOHN W. HOEFLING.